UNITED STATES PATENT OFFICE.

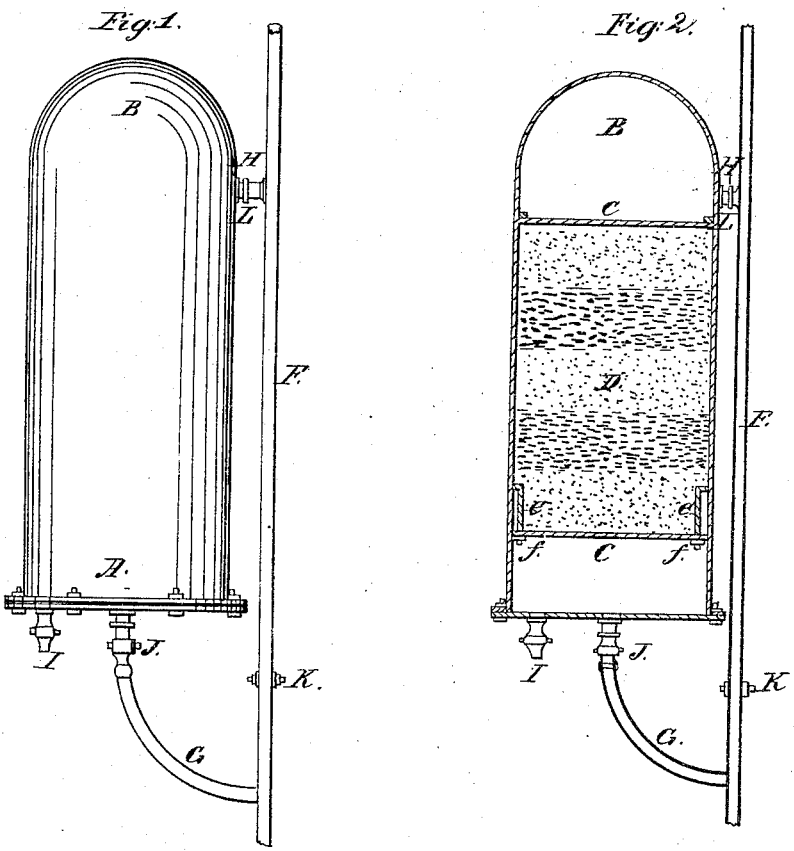

LYMAN A. GOUCH, OF YONKERS, NEW YORK.

IMPROVEMENT IN FILTERS.

Specification forming part of Letters Patent No. 44,797, dated October 25, 1864.

*To all whom it may concern:*

Be it known that I, LYMAN A. GOUCH, of Yonkers, in the county of Westchester and State of New York, have invented, made, and applied to use a new and improved Filter for Aqueduct and Cistern Water; and I do declare the following is a full, clear, and correct description of the same, reference being had to the accompanying drawings, and to the letters of reference marked thereon, in which—

Figure 1 is a perspective view of my improved filter; Fig. 2, a sectional view of the same.

Like parts of the invention are designated by the same letters of reference in the drawings.

The nature of my invention consists in the construction and operation of an improved filter, as hereinafter described.

To enable others skilled in the arts to make and use my invention, I will speak of the construction and operation of the same.

A shows a cylinder, made of iron or any suitable metal, made concave at one end on its inner side, as at B. C shows circular perforated plates, of tin or any suitable metal, placed within the cylinder A at a short distance from each end of the same, between which plates C the filtering medium D, composed of fine or coarse sand, charcoal, pebbles, or any suitable substance or substances, is contained. e shows small bolts inserted through the circular perforated plates C, and bearing against the filtering medium D, the pressure of said bolts e upon the filtering medium D being regulated by the nuts f upon the bolts e. F shows the main pipe, to which the cylinder A is attached and with which it communicates by means of the branch pipes G and H. I shows a discharge-cock inserted in the lower end of the cylinder A for the purpose of allowing any impurities that may collect in the cylinder to be drawn therefrom. J shows a cock placed upon the branch pipe G, for the purpose hereinafter described. K is a cock upon the main pipe F, and L is a cock upon the branch pipe H, for the purpose hereinafter described.

My improved filter being thus constructed, its operation is as follows: The cock K upon the main pipe F is closed, and the cock J upon the branch pipe G is opened. The water passes up the main pipe F and enters the cylinder A through the branch pipe G, passes through the filtering medium D, and, having been filtered, enters the main pipe F again, through the branch pipe H, the cock L upon the pipe H being opened for the purpose of establishing communication between the cylinder A and main pipe F. The water may then be drawn off from the main pipe F.

When desired to cleanse the cylinder A of any impurities that may have collected therein, the cock J upon the branch pipe G is closed and the cock K is opened, and the water travels up the main pipe F and enters the cylinder A at its upper end through the branch pipe H, runs down through the cylinder A, and is drawn off therefrom with any impurities that may have collected in the same by means of the discharge-cock I.

The use or employment of the bolts e, provided with the nuts f, allows the filtering material D to be adjusted to the pressure and quality of the water to pass through the same. If the water be exceedingly impure the nuts f upon the bolts e are tightened, by which means the filtering medium D is brought more closely together.

The cylinder A, being made concave on its interior at one end, and to act as an air-chamber, prevents sounds and the bursting of pipes by closing the cocks suddenly against high pressure, which causes the pipes to vibrate from one part of the building to the other.

My improved filter is particularly intended for marshy sections of the country, and from its peculiar construction will be found of advantage in cleansing cistern-water.

Having thus described my invention, what I claim therein as new, and desire to secure by Letters Patent, is—

The cylinder A, constructed as described, in combination with the filtering media D, screws e, bolts f, and perforated plates C, for the purpose set forth.

L. A. GOUCH.

In presence of—
 A. SIDNEY DOANE,
 T. SPENCER.